Aug. 19, 1930.  V. VALLETTA  1,773,288

TRANSMISSION GEARING

Filed April 2, 1929

Inventor
Vittorio Valletta

Patented Aug. 19, 1930

1,773,288

UNITED STATES PATENT OFFICE

VITTORIO VALLETTA, OF TURIN, ITALY, ASSIGNOR TO FIAT SOCIETÁ ANONIMA, OF TURIN, ITALY

TRANSMISSION GEARING

Application filed April 2, 1929, Serial No. 351,972, and in Italy December 12, 1928.

This invention provides improved transmission gearing for driving electric dynamos coupled to internal combustion engines (particularly the engines of motor vehicles) and enabling the angular velocity of the dynamo to be increased in relation to that of the engine in cases where it is not desirable, or practicable, to resort to a change of ratio in the direct drive.

According to the invention, use is made of an externally toothed pinion or pulley driven by the engine and carrying an internally toothed crown which gears interiorly with an eccentric pinion (whose dimensions depend on the desired ratio of transmission) connected with the dynamo shaft.

The axes of these two gear members may be parallel or may intersect or may occupy an oblique position in relation to each other, according to the disposition of the dynamo in relation to the engine shaft; and the pinion mechanism may be correspondingly cylindrical, conical, or helicoidal as occasion may require.

In the typical embodiment hereinafter described, the axes of the dynamo and engine are parallel, and consequently the gear members are cylindrical; but it will be understood that this type of construction is given merely by way of example and is not restrictive.

Figure 1:
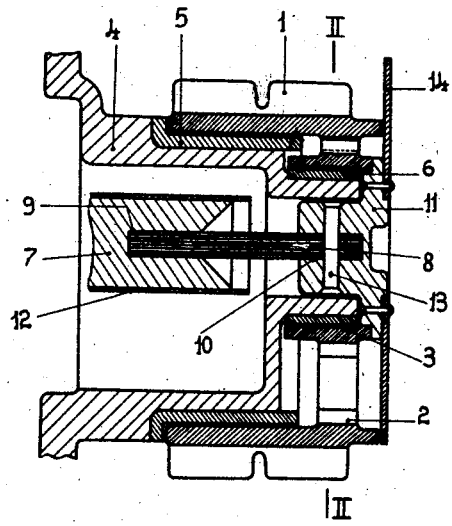
Figure 2:
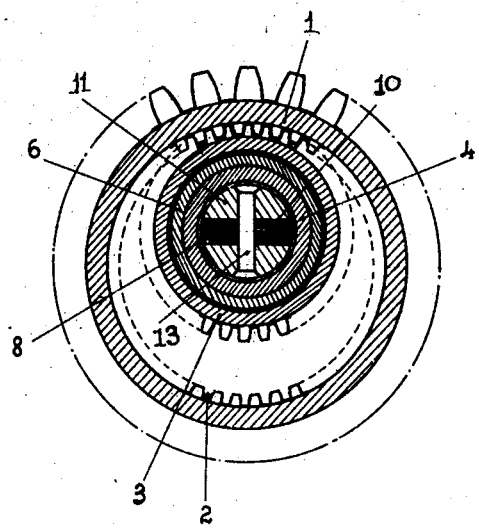

Figure 1 of the accompanying drawing shows an axial section of said embodiment, and Figure 2 a cross section along the line 11—11 of Figure 1.

1 denotes a pinion, which is driven direct by the engine by means of a chain or a set of pinions or in any other way, and is provided internally with a concentric toothed crown 2 either cut in the body of the pinion 1 or else applied to the latter.

Said toothed crown 2 gears with an eccentric pinion 3, the number of teeth on which determines the ratio of transmission that it is desired to establish between 2 and 3.

The shaft 7 of the dynamo is connected to the pinion by an elastic joint which may be of any known type but is preferably formed in the manner now to be described. A pack of thin metal sheets 8, forming an elastic member, is inserted between a recess 9 provided in the shaft 7 and a recess 10 provided in a hub 11 integral with the pinion 3. This pack is retained in position on the shaft 7 by a tube 12 which closes the recess 9 longitudinally, and on the hub 11 by means of a cotter or bolt 13 inserted crosswise through said hub. A protective disc 14 is secured on the outside of the latter.

The gear mechanism shown is mounted on a single support 4, on which are disposed two bearings 5 and 6 intended to support the pinions 1 and 3 respectively.

The mechanism can be lubricated in any suitable manner.

As already mentioned, the embodiment described is given merely by way of example, and its details may be varied, except as regards the more important characteristics without departing from the scope of the invention.

What I claim is:

1. Coupling, more particularly for connecting in self-propelled vehicles the internal combustion engine with the electric dynamo, comprising a toothed pinion adapted to receive motion directly from the combustion engine, an annular series of teeth on the inner face of the crown of said toothed pinion, a pinion eccentrically situated in and gearing with said internally toothed crown, a hub fast with said pinion and having a diametral slot, a shaft for the dynamo, a diametral slot on said shaft, a pack of thin metal sheets engaging by its ends in said slots, means for securing the pack of thin metal sheets on the hub and means on the dynamo shaft for preventing any lateral displacement of the pack of thin metal sheets.

2. Coupling, more particularly for connecting in self-propelled vehicles the internal combustion engine with the electric dynamo, comprising in combination a tubular support having an eccentric tubular projection of smaller diameter, a pulley adapted to receive motion directly from the combustion engine rotatably mounted on said tubular support so as to project therefrom, a crown of teeth on the inner face of the projecting portion of said pulley, a pinion gearing with said crown and rotatably mounted on the eccentric tubular projection of said support, a hub fast with said pinion mounted in said projection and means within the tubular support for connecting said hub with the dynamo shaft.

3. Coupling, more particularly for connecting in self-propelled vehicles the internal combustion engine with the dynamo, comprising in combination a tubular support having an eccentric tubular projection of smaller diameter, a crown rotatably mounted on said support and having an outer row of teeth for directly receiving motion from the combustion engine and a row of internal teeth, a pinion gearing with said internal row of teeth rotatably mounted on said tubular projection, a hub arranged in said tubular projection and fast with said pinion and having a diametral slot, a shaft for the dynamo arranged in said tubular support, a diametral slot on said shaft, a pack of thin metal sheets engaging by its ends in said slots, means for securing the pack of thin metal sheets on the hub and means on the dynamo shaft for preventing any lateral displacement of the pack of thin metal sheets.

In testimony that I claim the foregoing as my invention, I have signed my name.

VITTORIO VALLETTA.